(12) United States Patent
Yin et al.

(10) Patent No.: US 9,392,123 B1
(45) Date of Patent: Jul. 12, 2016

(54) DEPLOYING A TOLL-FREE DATA SERVICE CAMPAIGN FOR P2P COMMUNICATIONS

(71) Applicant: Verizon Patent and Licensing Inc., Arlington, VA (US)

(72) Inventors: Fenglin Yin, Lexington, MA (US); Susan Kelly, Maynard, MA (US); Ajit Nair, Newton, MA (US); Zhong Chen, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/635,702

(22) Filed: Mar. 2, 2015

(51) Int. Cl.
| | |
|---|---|
| *H04M 11/00* | (2006.01) |
| *H04M 15/00* | (2006.01) |
| *H04W 4/24* | (2009.01) |
| *H04L 29/08* | (2006.01) |
| *H04L 29/06* | (2006.01) |
| *H04W 68/00* | (2009.01) |

(52) U.S. Cl.
CPC ........... *H04M 15/09* (2013.01); *H04L 67/1091* (2013.01); *H04L 67/42* (2013.01); *H04M 15/80* (2013.01); *H04W 4/24* (2013.01); *H04W 68/00* (2013.01)

(58) Field of Classification Search
CPC ...... H04M 15/09; H04M 15/80; H04L 67/42; H04L 67/1091; H04W 68/00; H04W 4/24
USPC ........ 455/406, 416, 417, 414.1; 705/7.13, 52, 705/40, 14.64, 2, 30, 14.54
See application file for complete search history.

(56) References Cited

U.S. PATENT DOCUMENTS

| | | | | |
|---|---|---|---|---|
| 2012/0155380 | A1* | 6/2012 | Hodges | G06Q 30/00 370/328 |
| 2012/0278229 | A1* | 11/2012 | Vishwanathan | G06Q 20/123 705/40 |

* cited by examiner

*Primary Examiner* — Dhaval Patel

(57) ABSTRACT

A system may include one more devices to receive traffic information for a peer-to-peer communication, between a mobile device and a peer-to-peer client device via a peer-to-peer server, associated with a peer-to-peer network. The system may identify peer-to-peer server information associated with the peer-to-peer server and included in the traffic information and may compare the peer-to-peer server information with stored peer-to-peer server information associated with a toll-free data service campaign ("campaign"). The system may determine that the peer-to-peer server information is associated with the campaign if the peer-to-peer server information matches the stored peer-to-peer server information and may provide information to cause data charges, for the traffic flow, to be charged to a service provider associated with the campaign based on determining that the peer-to-peer server information provided in the traffic information is associated with the campaign.

20 Claims, 13 Drawing Sheets

100

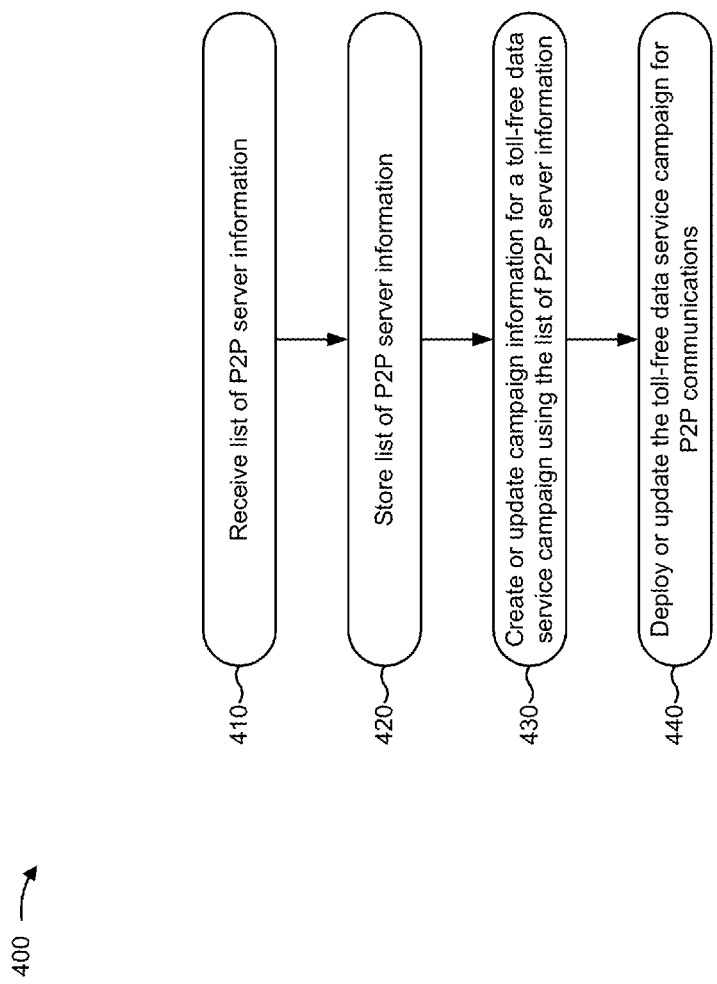

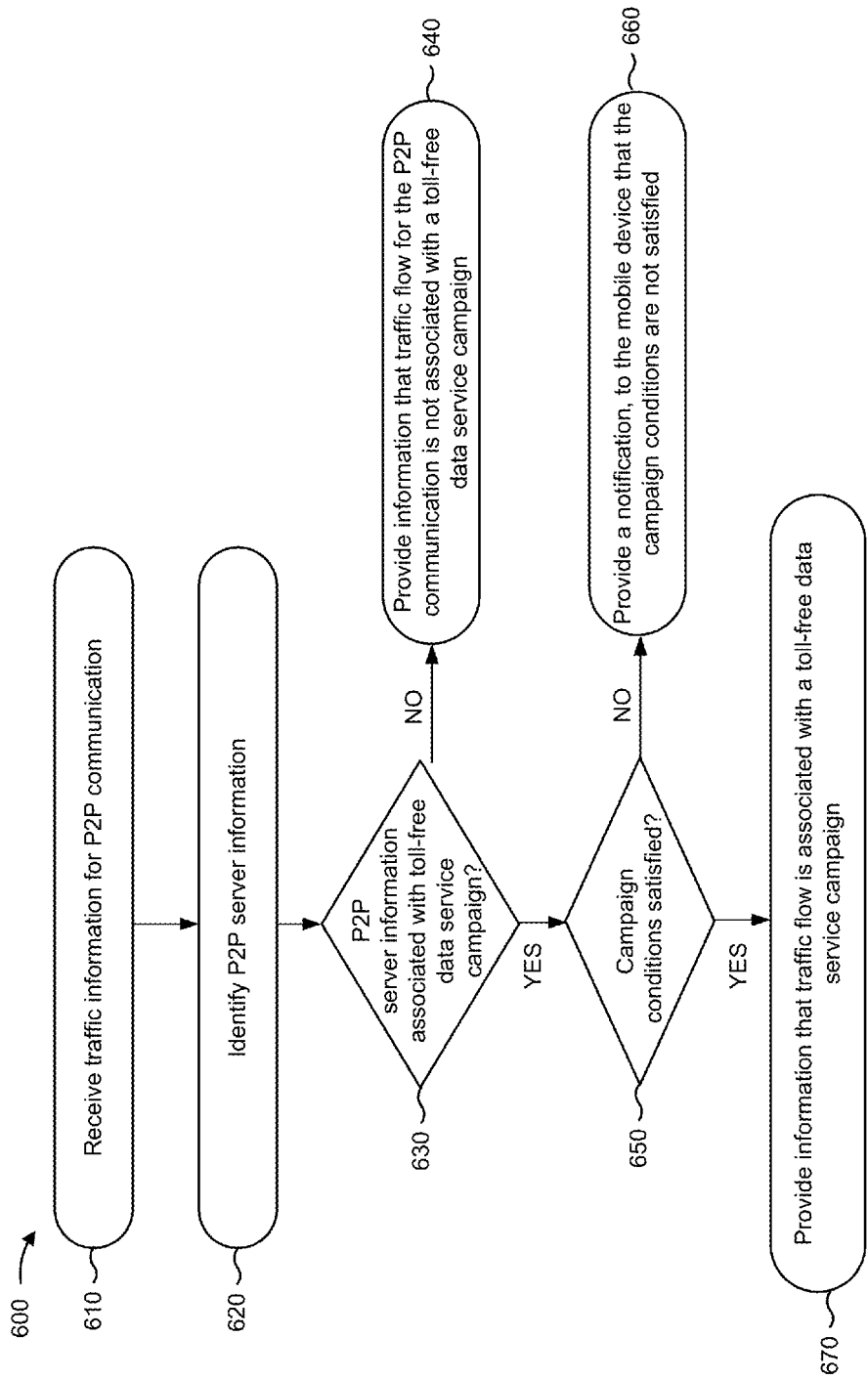

DEPLOYING A TOLL-FREE DATA SERVICE CAMPAIGN FOR P2P COMMUNICATIONS

BACKGROUND

A toll-free telephone number may refer to a special telephone number that is free for the calling party, with the cost of the call instead being charged by the telephone carrier to the called party. Similarly, a toll-free data service may refer to a service where a network operator charges data usage (e.g., byte usage) to a service provider that sponsors the toll-free data service, rather than to an end user that uses the toll-free data service.

BRIEF DESCRIPTION OF THE DRAWINGS

FIG. 4 is a flow chart of an example process for deploying a toll-free data service campaign for peer-to-peer communications;

FIG. 6 is a flow chart of an example process for implementing a deployed toll-free data service campaign for P2P communications.

DETAILED DESCRIPTION OF PREFERRED EMBODIMENTS

Figure 1A:
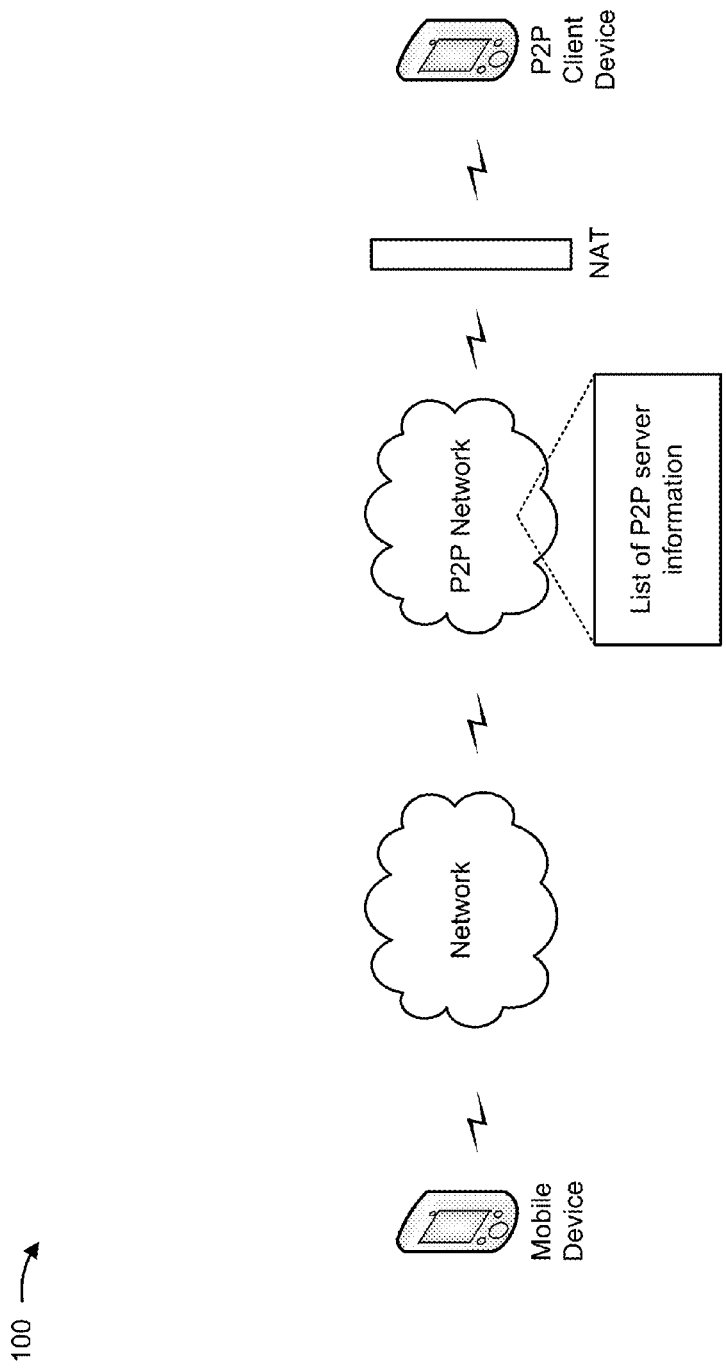
FIGS. 1A-1B are diagrams of an overview of an example implementation described herein.

The following detailed description of example implementations refers to the accompanying drawings. The same reference numbers in different drawings may identify the same or similar elements.

A toll-free data service may refer to a service where a network operator charges data usage (e.g., byte usage) to a service provider that sponsors the toll-free data service, rather than to an end user that uses a mobile device to access the toll-free data service. A service provider may set up a toll-free data service campaign that describes parameters of a toll-free data service, such as a uniform resource identifier (URI) (e.g., a uniform resource locator (URL), a uniform resource name (URN), etc.) that may be used to access the toll-free data service. A network operator may use the parameters to deploy the toll-free data service campaign.

Deploying a toll-free data service campaign for peer-to-peer (P2P) communications, however, may prove challenging. A P2P communication (e.g., file sharing, video messaging, instant messaging, voice over IP communications, etc.) is a decentralized communications model, within a P2P network, in which each party to the P2P communication has the same capabilities. Either party may initiate a communication session. Unlike a traditional client/server model, in which a client makes a service request and a server fulfills the request, the P2P network allows devices associated with the P2P communication to function as both a client and a server.

A toll-free data service campaign for a P2P communication requires identifying a network address and a port identifier for one or more devices (e.g., a mobile phone and/or a P2P client device), engaged in the P2P communication, to charge the data usage to a P2P service provider, offering a toll-free data service associated with the P2P communication. Generally, one or more client devices, seeking to have a P2P communication operate, in a local network behind a Network Application Translator (NAT).

A NAT is a networking service that allows devices on a private network to communicate with devices on a public network, such as the Internet. Using a NAT allows one or more devices, on a private network, to be viewed, by devices outside the NAT, as having the same Internet connection or the same network address. The NAT also dynamically allocates a source Internet protocol (IP) address (or network address) and a port identifier for communication directed to devices behind the NAT. The NAT may rewrite the network address and the port identifier at times. Without a permanent, stable network address and port, applying a toll-free data service campaign to P2P communications proves challenging as detecting traffic information for the P2P communication is difficult.

Additionally, or alternatively, detecting traffic information for a traffic flow to a P2P client device, located behind a NAT, may pose additional challenges as the NAT cannot determine to which P2P client device the traffic flow is intended. Consequently, P2P communications, directed to a particular P2P client device, may be dropped by the NAT. Implementations described herein enable charging data usage for a P2P communication associated with a toll-free data service campaign, to a P2P service provider, based on determining, in near real-time, traffic information associated with a P2P server, used to facilitate the P2P communication via a NAT.

FIG. 1 is a diagram of an overview of an example implementation 100 described herein. As shown in FIG. 1, a mobile device and a P2P client device may seek to have a P2P communication using a P2P application associated with a P2P network. The mobile device and the P2P client device, however, may not be able to directly communicate because the P2P client device is located behind a NAT.

A technique, known as relaying, allows for a P2P client device to communicate directly with a mobile device via a NAT. Relaying allows for the P2P client device and the mobile device to communicate using a P2P server, located within a P2P network, where the P2P client device and the mobile device, each have an independent, established client/server relationship with the P2P server. The P2P client device and/or the mobile device may use the P2P server to forward a P2P communication to the other. Relaying is one technique for a mobile device and a P2P client device to communicate via a NAT. Other ways may be possible.

Assume that the mobile device and the P2P client device, as shown in FIG. 1A, each has an independent, established client/server relationship with the P2P server. Assume that the mobile device uses the P2P server to relay communication to the P2P client device, and vice versa. As shown in FIG. 1A, the P2P network may generate a list with P2P server information, including a network address and a port identifier, for the P2P server, operating within the P2P network and facilitating a P2P communication between the mobile device and the P2P client device, located behind the NAT.

Figure 1B:
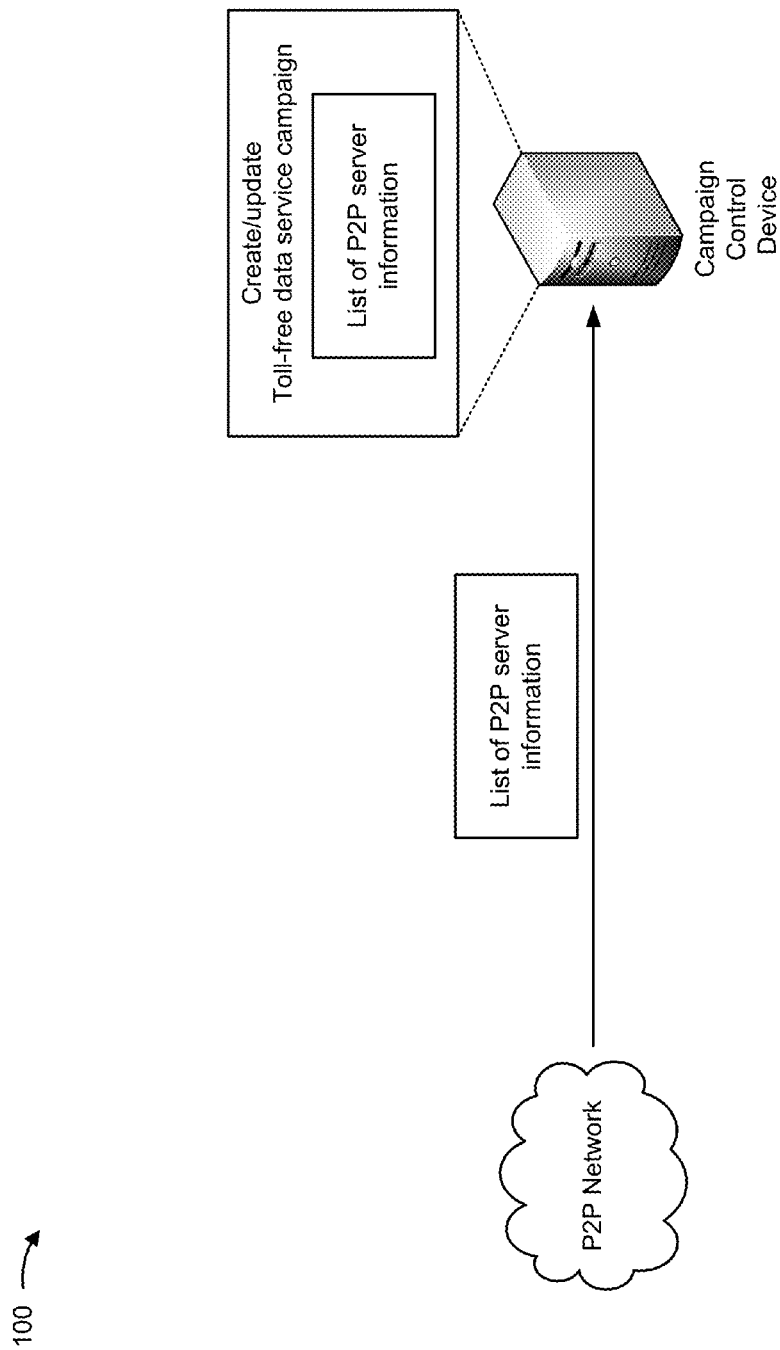

As shown in FIG. 1B, the P2P network may provide the list of P2P server information to a campaign control device in real-time or near real-time (which includes real-time or substantially real-time) when a P2P server facilitates and/or is identified as a server facilitating a P2P communication. The campaign control device may create and/or update a toll-free data service campaign for traffic flow for P2P communications associated with the P2P server information provided on the list. Using P2P server information, received in real-time or near real-time, for P2P servers facilitating communications between a mobile device and a P2P client device via a NAT may facilitate deploying a toll-free data service campaign for P2P communications and charging data usage to the P2P service provider for the toll-free data service.

Figure 2:
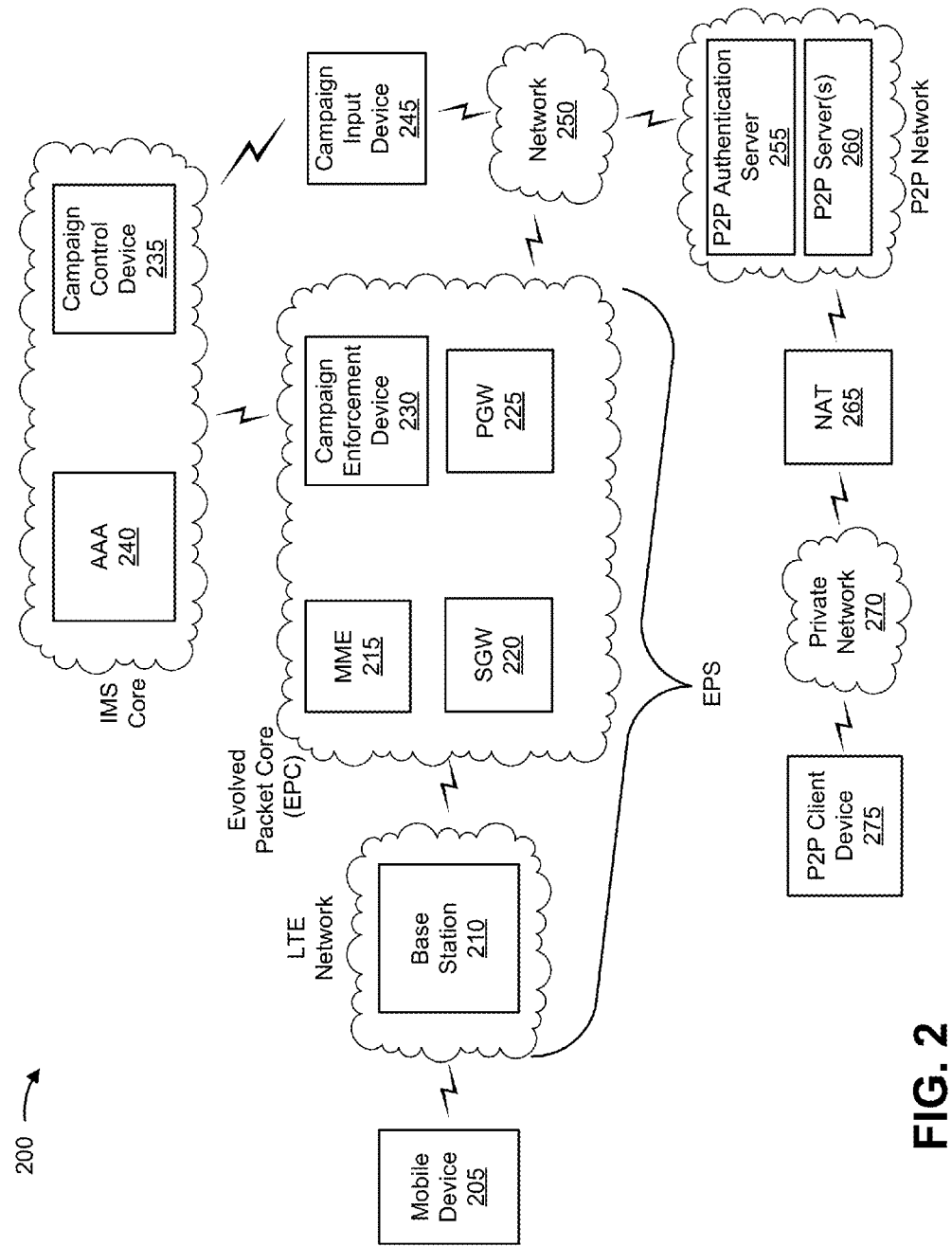
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205; a base station 210; a mobility management entity device (MME) 215; a serving gateway (SGW) 220; a packet data network gateway (PGW) 225; a campaign enforcement device 230; a campaign control device 235; an authentication, authorization, and accounting server (AAA) 240; a campaign input device 245; a network 250; a P2P authentication server 255, a P2P server(s) 260, a NAT 265, a private network 270, and/or a P2P client device 275. Devices of environment 200 may interconnect via wired connections, wireless connections, or a combination of wired and wireless connections.

Some implementations are described herein as being performed within a long term evolution (LTE) network for explanatory purposes. Some implementations may be performed within a wireless network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which mobile devices 205 communicate with the EPC. The EPC may include MME 215, SGW 220, PGW 225, and campaign enforcement device 230 that enable mobile devices 205 to communicate with network 250 and/or an Internet protocol (IP) multimedia subsystem (IMS) core. The IMS core may include campaign control device 235 and/or AAA 240, and may manage device registration and authentication, session initiation, campaign information, etc., associated with mobile devices 205 and/or network 250. Campaign control device 235 and/or AAA 240 may reside in the EPC and/or the IMS core.

Mobile device 205 may include one or more devices capable of communicating with base station 210 and/or a network (e.g., network 250). For example, mobile device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a type of similar device. Mobile device 205 may send traffic to and/or receive traffic from network 250 (e.g., via base station 210, SGW 220, PGW 225, and/or campaign enforcement device 230).

In some implementations, mobile device 205 may be promoted to P2P server 260, where mobile device 205 may act as a centralized server to a set of devices (e.g., mobile device(s) 205 and/or other P2P client device(s) 275). Mobile device 205 may facilitate P2P communications between mobile device(s) 205 and P2P client device(s) 275. Mobile device 205 may receive a replicated user directory, including identification information for mobile device(s) 205 and/or P2P client device(s) 275 that may use mobile device 205 to facilitate a P2P communication. In such cases, mobile device 205 may be referred to as P2P server 260.

Base station 210 may include one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 250 via SGW 220, PGW 225, and/or campaign enforcement device 230. Additionally, or alternatively, one or more base stations 210 may be associated with a RAN that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 may include one or more devices, such as one or more servers, capable of managing authentication, activation, deactivation, and mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205 (via campaign enforcement device 230). MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 250 (e.g., via PGW 225 and campaign enforcement device 230) and/or other network devices associated with the EPC and/or the IMS core. SGW 220 may also receive traffic from network 250 (via campaign enforcement device 230) and/or other network devices, and may send the received traffic to mobile device 205 via base station 210. Additionally, or alternatively, SGW 220 may perform operations associated with handing off mobile device 205 to and/or from an LTE network.

PGW 225 may include one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, PGW 225 may aggregate traffic received from one or more SGWs 220, and may send the aggregated traffic to network 250 via campaign enforcement device 230. Additionally, or alternatively, PGW 225 may receive traffic from network 250 via campaign enforcement device 230, and may send the traffic to mobile device 205 via SGW 220 and base station 210. PGW 225 may record data usage information (e.g., byte usage), and may provide the data usage information to AAA 240.

Campaign enforcement device 230 may include one or more devices capable of inspecting traffic and applying one or more campaign rules to the traffic. For example, campaign enforcement device 230 may include a gateway, a router, a modem, a switch, a firewall, a NIC, a hub, a bridge, a server, an OADM, or a similar type of device. Campaign enforcement device 230 may receive campaign rules from campaign control device 235, may apply the campaign rules to traffic received from PGW 225, and may instruct PGW 225 how to handle the traffic based on the campaign rules. Additionally, or alternatively, campaign enforcement device 230 may instruct AAA 240 how to charge for data usage associated with the traffic. Different campaign enforcement devices 230 may be associated with different geographic regions and/or cellular service areas, in some implementations.

Campaign control device 235 may include one or more devices capable of receiving, generating, storing, processing, and/or providing information associated with a toll-free data service campaign (e.g., campaign information, campaign rules, etc.). For example, campaign control device 235 may include a server or a similar type of device. Campaign control device 235 may receive campaign information from campaign input device 245, may generate campaign rules based on the campaign information, and may deploy the campaign rules to one or more campaign enforcement devices 230 (e.g., associated with one or more cellular service areas).

AAA 240 may include one or more devices, such as one or more servers, that perform authentication, authorization, and/or accounting operations for communication sessions associated with mobile device 205. For example, AAA 240 may store data usage information for mobile device 205, for a user associated with mobile device 205, for P2P client device 275, for a user associated with P2P client device 275 (e.g., that provides a toll-free data service), or the like.

Campaign input device 245 may include one or more devices capable of receiving, generating, storing, processing, and/or providing information associated with a toll-free data service campaign. For example, campaign input device 245 may include a desktop computer, a laptop computer, a mobile phone, a server, or a similar type of device. Campaign input device 245 may receive input, from a service provider, that identifies campaign information, and may provide the campaign information to campaign control device 235.

Network 250 may include one or more wired and/or wireless networks. For example, network 210 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

P2P authentication server 255 may include one or more devices capable of generating, processing, and/or providing information. For example, P2P authentication server 255 may generate, process, store, and/or provide authentication information for one or more devices (e.g., mobile device 205, P2P client device 275, or the like) that may use a P2P application associated with P2P authentication server 255 for communicating. Additionally, and/or alternatively, P2P authentication server 255 may receive P2P server information, including a network address and a port identifier, from one or more P2P server(s) 260 in real-time or near real-time.

Additionally, or alternatively, P2P authentication server 255 may generate a list of P2P server information received from one or more P2P server(s) 260, facilitating P2P communications between mobile device(s) 205 and P2P client device(s) 275. Additionally, or alternatively, P2P authentication server 255 may send the list of P2P server information to campaign control device 235, in real-time or near real-time. In some implementations, P2P authentication server 255 may include a communication interface that allows P2P authentication server 255 to receive information from or transmit information to network 250, P2P server 260, and/or another device.

P2P server 260 may include one or more server devices capable of generating, processing, and/or providing information. For example, P2P server 260 may facilitate P2P communications between mobile device 205 and P2P client device 275. In some implementations, P2P server 260 may generate, process, store, and/or provide P2P server information to P2P authentication server 255. Additionally, or alternatively, P2P server 260 may send a list of P2P server information to P2P authentication server 255 in real-time or near real-time. In some implementations, P2P server 260 may include a communication interface that allows P2P server 260 to receive information from or transmit information to P2P authentication server 255, NAT 265, private network 270, P2P client device 275, and/or another device.

NAT 265 may include a network security device that provides NAT functionality and protects devices of private network 270 (e.g., P2P client device 275) from devices outside of private network 270. For example, NAT 265 may include a gateway, a router, a switch, a firewall, or the like. NAT 265 may perform security operations in order to protect P2P client device 275 from attacks originating outside of private network 270. NAT 265 may perform network address translation by re-writing a source and/or destination network address included within packets that flow through NAT 265. Upon receiving a packet from a P2P client device 275 designated for network 250, NAT 265 may re-write a private network source address assigned to P2P client device 275 with a public network address. Upon receiving a return packet in response to the packet from P2P client device 275, NAT 265 may re-write the destination address of the return packet with the appropriate private network address. In this manner, NAT 265 may obscure the internal structure of private network 270 by making it appear that only one device, e.g., NAT 265, sends and receives data via the single public network address.

Private network 270 may include a local area network LAN, a WAN, a MAN, a company intranet, or another type of protected network. Private network 270 may also include organizational components, devices, servers, etc., such as NAT 265, P2P client device 275, server devices (not shown in FIG. 2), etc. In some implementations, private network 270 may include a network that uses network 250 to provide remote devices (e.g., mobile device 205) with secure access to network resources provided in private network 270.

P2P client device 275 may include a device capable of providing, presenting, and/or displaying information. For example, P2P client device 275 may include a mobile phone (e.g., a smart phone, a radiotelephone, etc.), a computing device (e.g., a desktop computer, a laptop computer, a tablet computer, a handheld computer, etc.), or a similar device. In some implementations, P2P client device 275 may include a communication interface that allows P2P client device 275 to receive information from and/or transmit information to network 250, P2P authentication server 255, NAT 265, and/or another device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
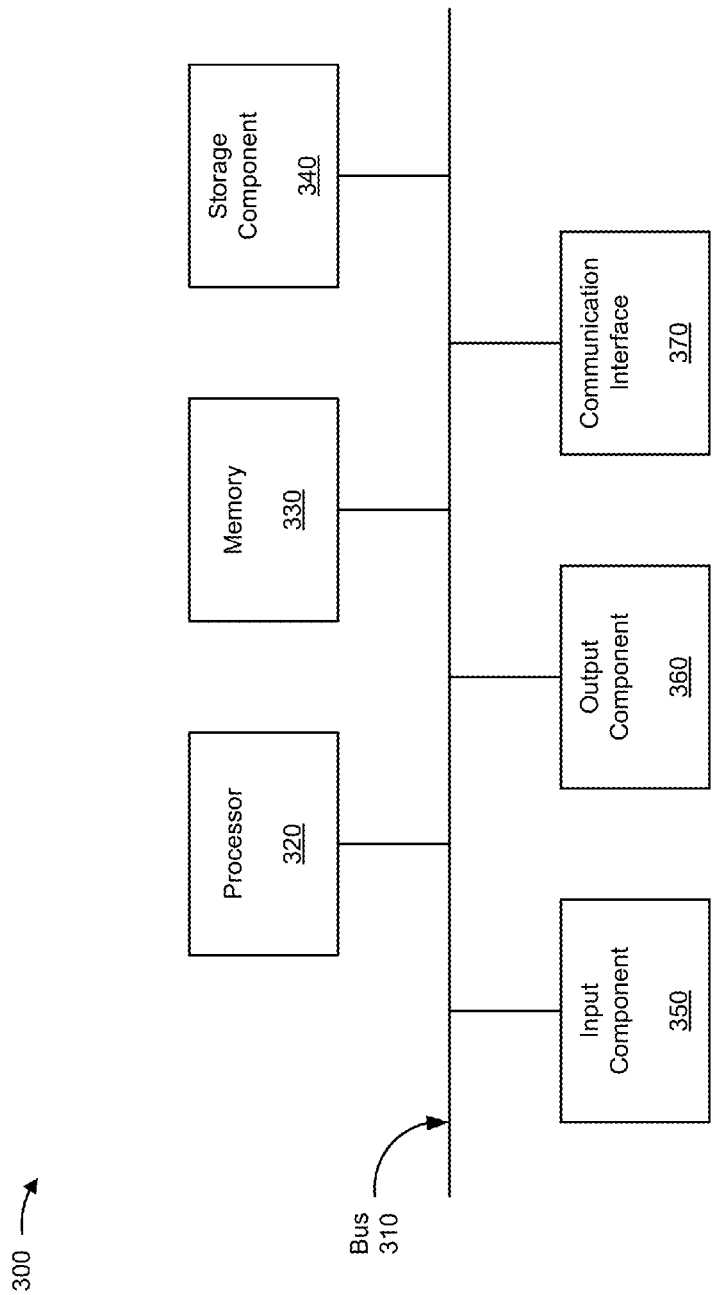
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, campaign enforcement device 230, campaign control device 235, AAA 240, campaign input device 245, P2P authentication server 255, P2P server 260, NAT 265, and/or a P2P client device 275. In some implementations, mobile device 205, base station 210, MME 215, SGW 220, PGW 225, campaign enforcement device 230, campaign control device 235, AAA 240, campaign input device 245, P2P authentication server 255, P2P server 260, NAT 265, and/or P2P client device 275 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for deploying a toll-free data service campaign for P2P communications. In some implementations, one or more process blocks of FIG. 4 may be performed by campaign control device 235. In some implementations, one or more process blocks of FIG. 4 may be performed by another device or a group of devices separate from or including campaign control device 235, such as mobile device 205, base station 210, MME 215, SGW 220, PGW 225, campaign enforcement device 230, AAA 240, campaign input device 245, P2P authentication server 255, P2P server 260, NAT 265, and/or P2P client device 275.

As shown in FIG. 4, process 400 may include receiving a list of P2P server information (block 410). For example, campaign control device 235 may receive, from P2P authentication server 255 (e.g., via network 250), a list with P2P server information, including a network address and associated port identifier for one or more P2P server(s) 260 involved in facilitating P2P communications between mobile device 205 and P2P client device 275. P2P server 260 may facilitate one or more P2P communications between mobile device 205 and P2P client device 275 located behind NAT 265 using various techniques (e.g., relaying, connection reversal, user datagram protocol (UDP) hole punching, etc.).

For example, P2P communications may traverse a NAT using a technique known as relaying. Either mobile device 205 (e.g., Client A with a network address=10.0.0.1 and a port=4321) and P2P client device 275 (e.g., Client B with a network address=10.1.1.3 and a port=4321) may initiate a communication using transmission control protocol (TCP) or user datagram protocol (UDP) to a known P2P server 260 (e.g., Server S with a global network address=18.181.0.031 and a port=1234). P2P client device 275 may be located behind NAT 265 (e.g., NAT B with a network address=155.99.25.11 and a port=62000).

Instead of attempting a direct connection with P2P client device 275, mobile device 205 may send a P2P communication to P2P server 260, using an established client/server connection between mobile device 205 and P2P server 260, over one or more public networks, including network 250

(e.g., Client A sends a P2P communication along an established Session A-S connection to Server S over one or more public networks, including a LTE network). A network address and a port for mobile device 205 may serve as a source network address and a source port for the P2P communication (e.g., the network address of Client A=a source network address=10.0.0.1 and the port of Client A=a source port=4321). A network address and a port for P2P server 260 may serve as a destination network address and a destination port for the P2P communication (e.g., the network address of Server S=a destination port network address=18.181.0.031 and the port of Server S=a destination port=1234).

Additionally, or alternatively, P2P server 260 may forward the P2P communication to P2P client device 275, using an established client/server connection between P2P client device 275 and P2P server 260, over via NAT 265 (e.g. Server S may forward the P2P communication along an established Session B-S connection to Client B over via NAT B). The network address and the port for P2P server 260 may serve as a source network address and a source port for the P2P communication (e.g., the network address of Server S=a source network address=18.181.0.031 and a port of Server S=the destination port=1234). A network address and a port for NAT B may serve as the destination network address and the destination port for the P2P communication to Client B (e.g., a network address of NAT B=a destination network address=155.99.25.11 and a port of NAT B=the destination port=62000).

Additionally, or alternatively, P2P client device 275 may send a P2P communication to P2P server 260, using the established client/server connection between P2P client device 275 and P2P server 260, via NAT 265, (e.g., Client B sends a P2P communication along the established Session B-S connection to Server S over NAT B). The network address and the port for NAT B may serve as a source network address and a source port for the P2P communication from Client B (e.g., the network address of NAT B=a source network address=155.99.25.11 and the port of NAT B=a source port=62000). The network address and the port for P2P server 260 may serve as a destination network address and a destination port for the P2P communication (e.g., the network address of Server S=a destination network address=18.181.0.031 and the port of Server S=a destination port=1234).

Additionally, or alternatively, P2P server 260 may forward the P2P communication to mobile device 205, using the established client/server connection between mobile device 205 and P2P server 260, over one or more public networks, including network 250 (e.g., Server S sends the P2P communication along the established Session A-S connection to Client A over one or more public networks, including a LTE network). The network address and the port for P2P server 260 may serve as a source network address and a source port for the P2P communication (e.g., the network address of Server S=a source network address=18.181.0.031 and the port of Server S=a destination port=1234). The network address and the port for mobile device 205 may serve as a destination network address and a destination port for the communication (e.g., network address of Client A=a destination network address=10.0.0.1 and the port of Client A=a destination port=4321). Relaying is one technique for a mobile device and a P2P client device to communicate via a NAT. Other ways may be possible.

During a P2P communication, initiated by either mobile device 205 or P2P client device 275, P2P server 260 may serve as both an intermediary source and/or an intermediary destination for the P2P communication. (e.g., the network address for Server S may serve as a source network address and/or a destination network address and the port for Server S may serve as a source port and/or a destination port for a P2P communication). P2P authentication server 255 may receive P2P server information, including a network address and a port identifier for one or more P2P server(s) 260, facilitating P2P communications between mobile device 205 and P2P client device 275. In some implementations, one or more mobile device(s) 205 may be communicating with one or more associated P2P client device(s) 275.

In some implementations, mobile device 205 may be promoted to P2P server 260 by P2P authentication server 255. For example, P2P authentication server 255 may replicate a user directory, including mobile device(s) 205 and/or P2P client device(s) 275, located behind NAT(s) 275 and engaged in P2P communications facilitated by mobile device 205. Additionally, or alternatively, P2P authentication server 255 may provide the user directory to mobile device 205 to enable a promotion to P2P server 260.

Additionally, or alternatively, P2P authentication server 255 may generate a list of P2P server information, including a network address and port identifier for one or more P2P server(s) 260, facilitating communications between mobile device(s) 205 and P2P client device(s) 275. In some implementations, P2P authorization server 255 may generate the list of P2P information in real-time or near real-time (e.g., when the P2P communications are being established). P2P authorization server 255 may provide the list of P2P information to campaign control device 235 in real-time or near real-time (e.g., when the list is generated).

Campaign control device 235 may receive the list of P2P server information generated by P2P authentication server 255. Additionally, or alternatively, campaign control device 235 may receive an updated list of P2P server information based on new P2P communications between mobile device(s) 205 and P2P client device(s) 275, facilitated by P2P server(s) 260.

In some implementations, P2P authentication server 255 may generate and/or send the list of P2P server information for one or more P2P server(s) 260, facilitating P2P communications, to campaign control device 235 prior to the P2P communications being initiated by either mobile device 205 and/or P2P client device 275. In some implementations, a user of campaign control device 235 may input the list of one or more P2P server(s) 260 to campaign control device 235.

As shown in FIG. 4, process 400 may include storing the list of P2P server information (block 420). For example, campaign control device 235 may store the list of P2P server information received from P2P authentication server 255. In some implementations, the list of P2P server information may be stored in one or more memory devices associated with campaign control device 235 and/or another device.

As shown in FIG. 4, process 400 may include creating or updating campaign information for a toll free campaign using the list of P2P server information (block 430). For example, campaign control device 235 may receive campaign information for deploying a toll-free data service campaign for P2P communications. A toll-free data service campaign for P2P communications (sometimes referred to herein as a campaign) may refer to a toll-free data service campaign, established by a P2P service provider, where the P2P service provider agrees to be charged for data usage by users of mobile devices 205 and/or P2P client device 275 that access P2P applications provided by the P2P service provider (e.g., rather than the users being charged for the data usage).

Campaign information may include information provided on the list of P2P server information, including a network address and port identifier for P2P server 260, provided in real-time or near real-time by authentication server 255 and/or inputted directly into campaign control device 235. Additionally, or alternatively, campaign information may include, for example, information that identifies a P2P service provider associated with a campaign, information that identifies a P2P network that provide a P2P application associated with a campaign, information that identifies a geographic region associated with a campaign, information that identifies a time period during which a campaign is valid, information that identifies an amount of data (e.g., in bytes) that the service provider will pay for during the campaign (e.g., a maximum amount of data), a P2P server network address and a port identifier from the list received from P2P authentication server 255, or the like. Additionally, or alternatively, campaign information may be updated in real-time or near real-time. For example, the campaign information may be updated each time campaign control device 235 receives a list of P2P server information, including a network address and a port identifier for P2P server 260, from P2P authentication server 255.

As shown in FIG. 4, process 400 may include deploying or updating a toll-free data service campaign for P2P communications (block 440). For example, campaign control device 235 may deploy the toll-free data service campaign for P2P communications using the list of P2P server information received from P2P authentication server 255 in real-time or near real-time and/or inputted by a user of campaign control device 235. Campaign control device 235 may deploy the toll-free data service campaign by providing campaign rules, that instruct campaign enforcement device(s) 230 how to handle network traffic, to campaign enforcement device(s) 230 associated with the campaign. For example, the campaign information may identify P2P server(s) 260, based on P2P server information, where traffic flow for P2P communications facilitated by P2P server(s) 260, may be considered toll-free (e.g., data usage for the traffic flow to be charged to the P2P service provider). Additionally, or alternatively, campaign information may identify a geographic region in which the campaign is to be deployed. Campaign control device 235 may identify campaign enforcement devices 230 located in the geographic region, and may provide campaign rules to the identified campaign enforcement devices 230.

Additionally, or alternatively, the campaign information may identify a time period during which the toll-free data service campaign is valid, and campaign control device 235 may provide information that identifies the time period to campaign enforcement devices 230 so that campaign enforcement devices 230 may determine a time period during which to treat traffic as toll-free. Additionally, or alternatively, the campaign information may identify a quantity of data (e.g., in bytes) to be allocated to a toll-free data service campaign, and campaign control device 235 may allocate some of the data to each of the identified campaign enforcement devices 230 so that campaign enforcement devices 230 may determine whether there is available data to be allocated to treat traffic as toll-free.

Additionally, or alternatively, the campaign information may be updated each time campaign control device 235 receives P2P server information from P2P authentication server 255. Additionally, or alternatively, campaign control device 235 may update the toll-free data service campaign by providing new campaign rules to campaign enforcement device 230 based on updated campaign information.

Campaign control device 235 may generate campaign rules based on the campaign information, in some implementations. A campaign rule may specify one or more campaign conditions for charging a service provider for data used by a mobile device to access a toll-free data service, as described in more detail elsewhere herein. Campaign control device 235 may combine the generated campaign rules into a configuration file, and may provide the configuration file to one or more campaign enforcement devices 230 when deploying the campaign.

Additionally, or alternatively, campaign control device 235 may provide a notification when campaign deployment has been completed. For example, campaign control device 235 may provide a notification to a P2P service provider (e.g., via an email address, via campaign input device 245, via another device associated with the P2P network, etc.). By using P2P server information, received in real-time or near real-time, for P2P servers facilitating communications between a mobile device and a P2P client device via a NAT, deploying a toll-free data service campaign for P2P communications and charging data usage to the P2P service provider for the toll-free service is possible.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of deploying a toll-free data service campaign for P2P communications.

Figure 5A:
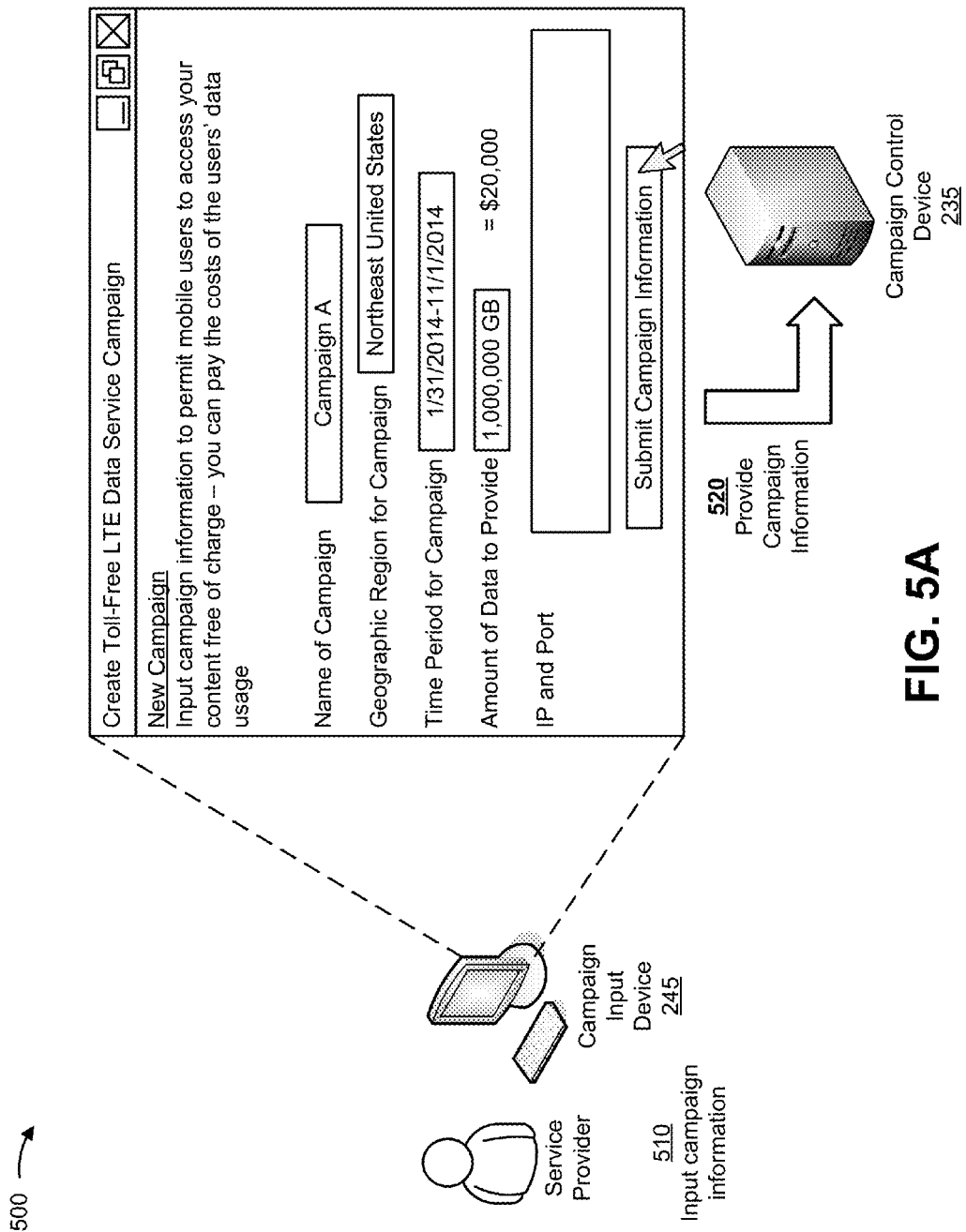
FIGS. 5A-5E are diagrams of an example implementation relating to the example process shown in FIG. 4.

As shown in FIG. 5A, and by reference number 510, assume that a P2P service provider interacts with campaign input device 245 to input campaign information to create a toll-free data service campaign. As shown, assume that the P2P service provider inputs a name of the campaign (e.g., a campaign identifier), shown as "Campaign A," a geographic region for the campaign, shown as "Northeast United States," a time period for the campaign, shown as "Jan. 31, 2014-Nov. 1, 2014," and an amount of data (e.g., a maximum amount) to be provided with the campaign, shown as "1,000,000 gigabytes (GB)," which corresponds to a payment of $20,000 by the service provider. As shown in FIG. 5A, assume that the P2P service provider establishes a field to receive P2P server information, including a network address (IP) and a port identifier, for one or more P2P servers facilitating P2P communications associated with a toll-free data service campaign.

As further shown, assume that the service provider interacts with an input mechanism, shown as a "Submit Campaign Information" button, to cause campaign input device 245 to provide the campaign information to campaign control device 235, as shown by reference number 520.

Figure 5B:
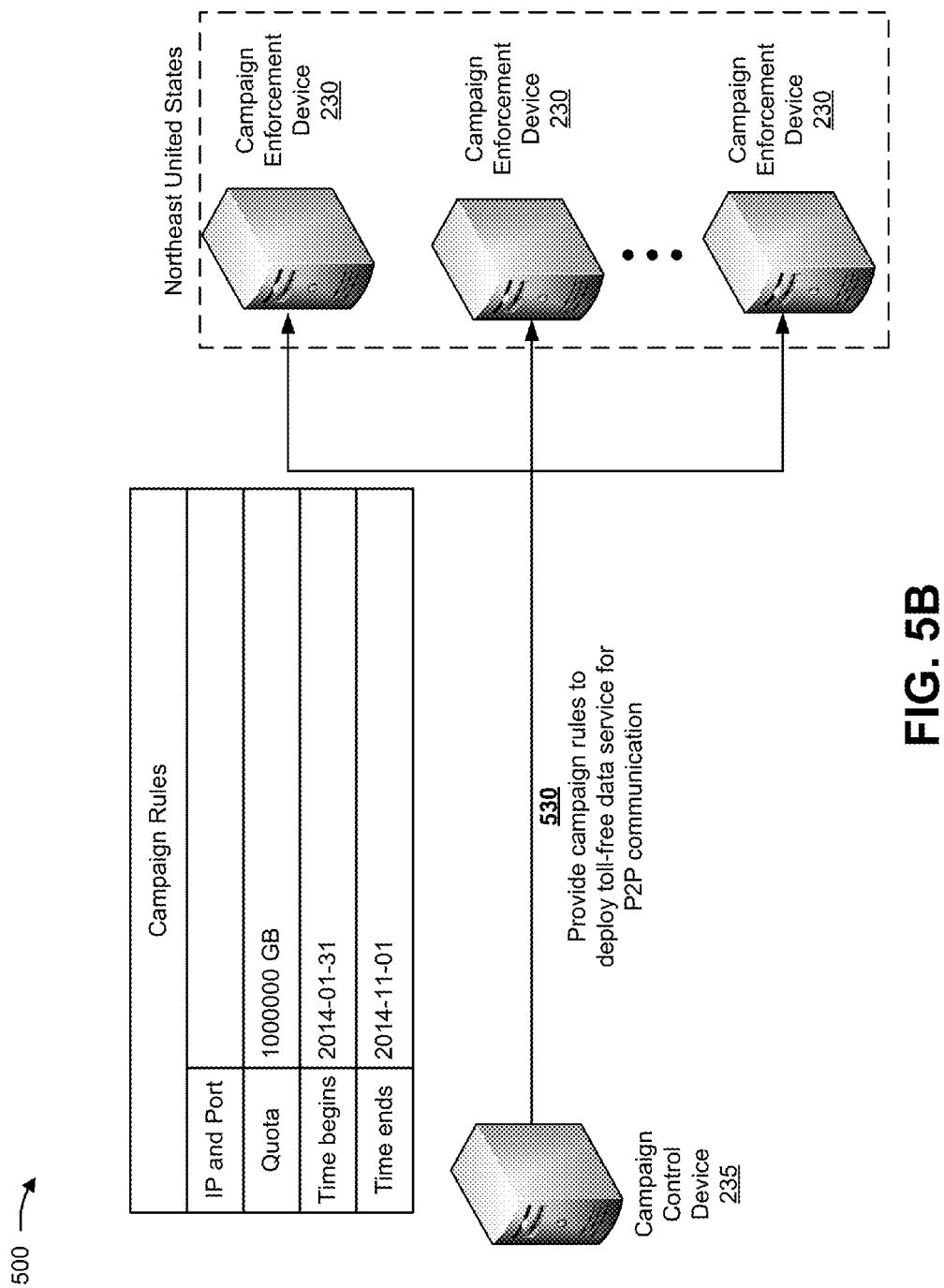

As shown in FIG. 5B, and by reference number 530, assume that campaign control device 235 deploys Campaign A by providing campaign rules for Campaign A (e.g., generated based on the campaign information received from campaign input device 245) to each campaign enforcement device 230 located in the Northeast United States. Assume that the campaign rules include an ability to receive P2P server information, including a network address and a port identifier, for one or more P2P servers facilitating P2P communications associated with a toll-free data service campaign.

Figure 5C:
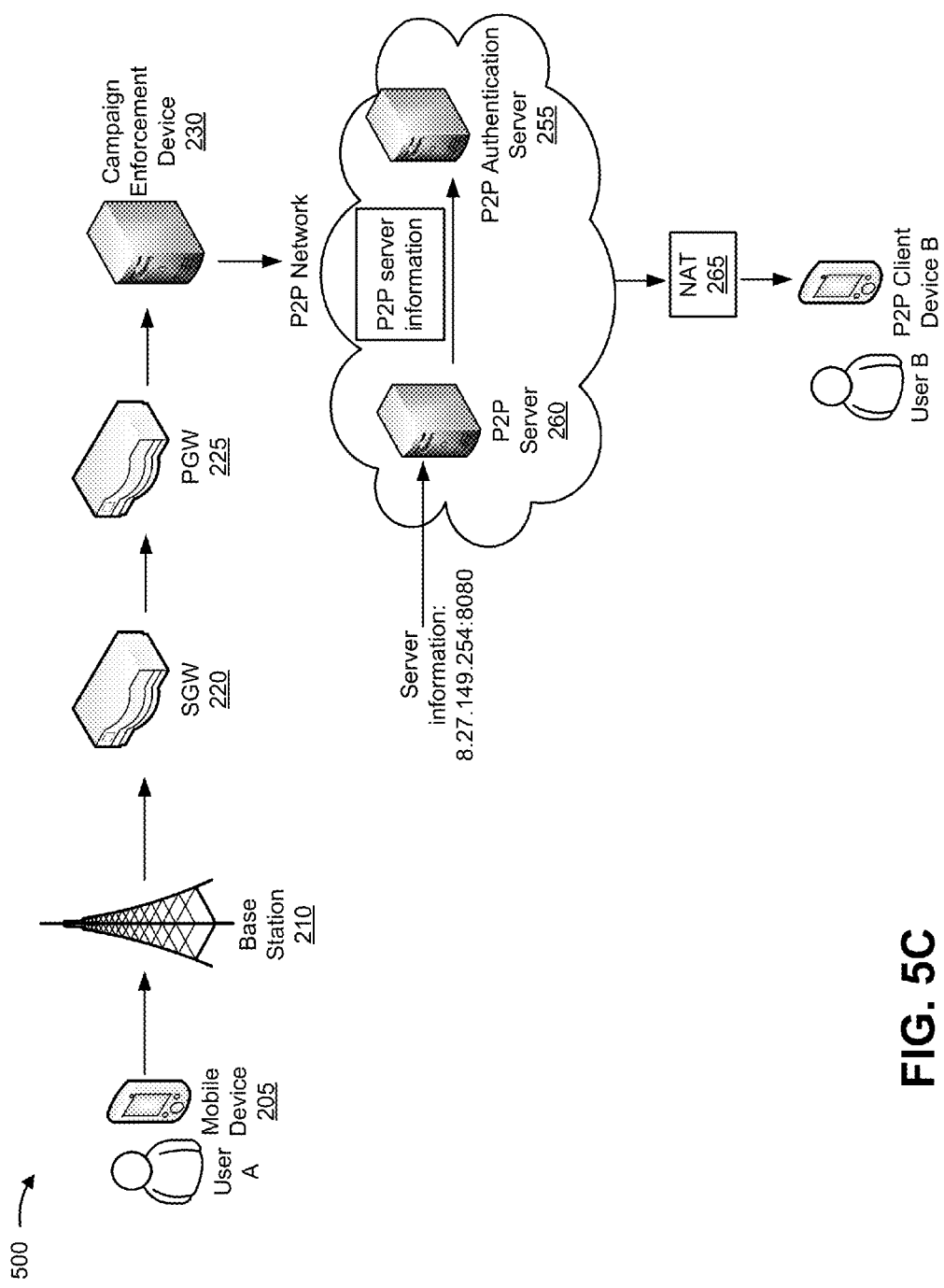

As shown in FIG. 5C, assume that a user, shown as User A, interacts with Mobile Device A (e.g., mobile device 205) to initiate a P2P communication with User B, interacting with P2P Client Device B, over a P2P network. As further shown, assume that P2P Client Device B is located behind a NAT (e.g., NAT 265). The P2P network includes P2P server 260 and P2P authentication server 255. As shown in FIG. 5C, assume that P2P server 260 has, for example, a network address=8.27.149.254 and a port identifier=8080. As shown in FIG. 5C, assume that P2P server 260 facilitates the P2P communication between Mobile Device A and P2P Client Device B. As shown in FIG. 5C, P2P server 260 provides P2P server information, including the network address and the port identifier, in real-time or near real-time (e.g., relative to establishing a P2P communication session between Mobile Device A and P2P Client device B), to P2P authentication server 255.

Figure 5D:
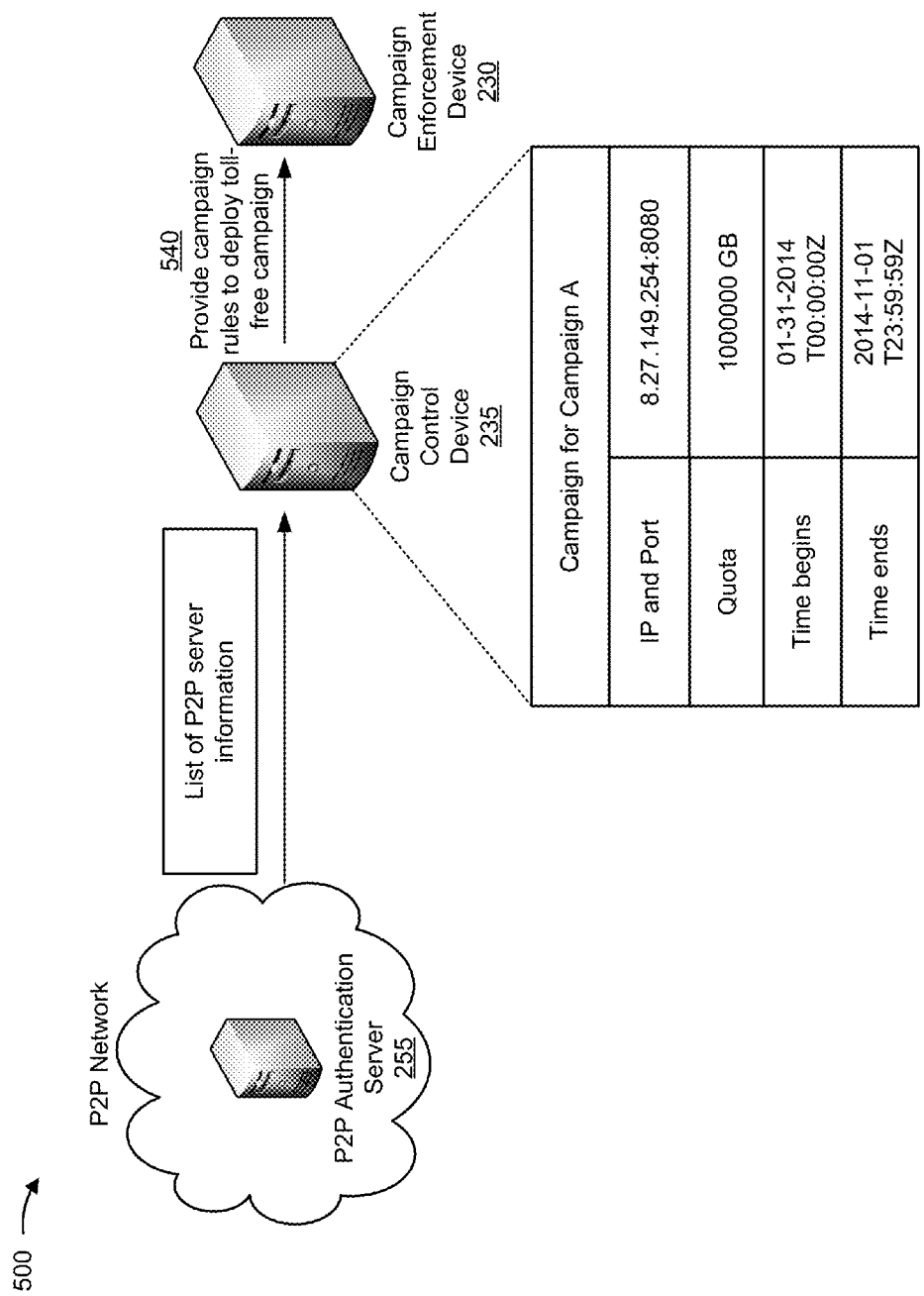

As shown in FIG. 5D, P2P authentication server 255 generates and sends a list of P2P server information, based on the received P2P server information from P2P server 260, to campaign control device 235 in real-time or near-real time (e.g., relative to receiving the P2P server information from P2P server 260). As shown in FIG. 5D, assume campaign control device 235 includes the P2P server information in the campaign rules for Campaign A. As shown in FIG. 5D, and by reference number 540, campaign control device 235 provides the campaign rules, including the P2P server information, to campaign enforcement device 230.

Figure 5E:
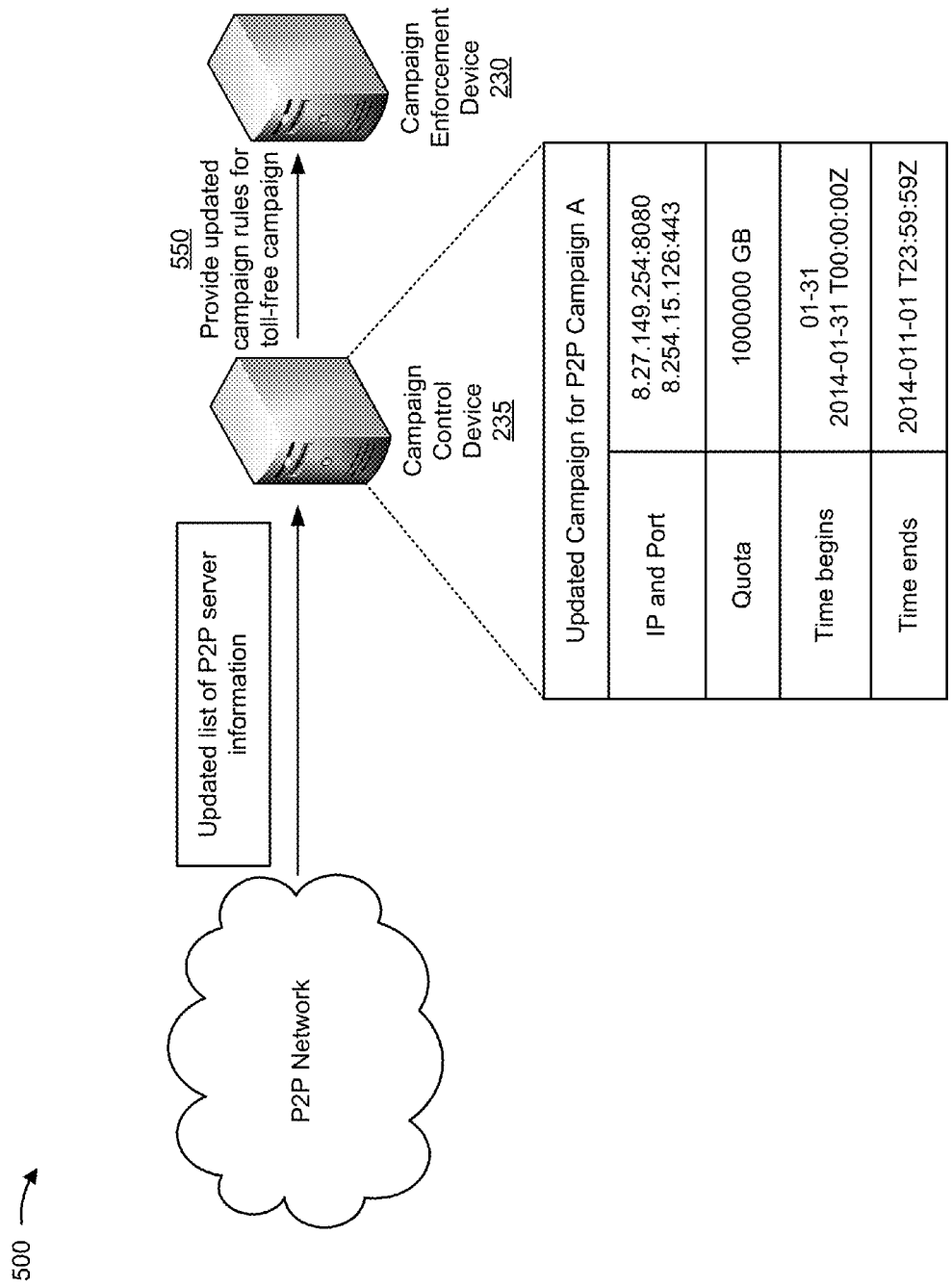

As shown in FIG. 5E, assume a second P2P communication occurs between a second mobile device 205 and a second P2P client device 275, facilitated by a second P2P server (e.g., a second P2P server 260). Assume further that the first P2P communication is still occurring. The P2P network sends an updated list of P2P server information, including a network address and port identifier for the second P2P server to campaign control device 235. As shown in FIG. 5E, and by reference number 550, campaign control device 235 may provide updated campaign rules to campaign enforcement device 230 for the toll-free data service campaign.

As indicated above, FIGS. 5A-5E are provided merely as an example. Other examples are possible and may differ from what was described with regard to FIGS. 5A-5E.

FIG. 6 is a flow chart of an example process 600 for implementing a deployed toll-free data service campaign for P2P communications. In some implementations, one or more process blocks of FIG. 6 may be performed by campaign enforcement device 230. In some implementations, one or more process blocks of FIG. 6 may be performed by another device or a group of devices separate from or including campaign enforcement device 230, such as mobile device 205, base station 210, MME 215, SGW 220, PGW 225, campaign control device 235, AAA 240, campaign input device 245, P2P authentication server 255, P2P server 260, NAT 265, and/or P2P client device 275.

As shown in FIG. 6, process 600 may include receiving traffic information for a P2P communication (block 610). For example, campaign enforcement device 230 may receive, from mobile device 205 and/or P2P client device 275 (e.g., via PGW 225), traffic information associated with a P2P communication between mobile device 205 and P2P client device 275.

As further shown in FIG. 6, process 600 may include identifying P2P server information (block 620). For example, campaign enforcement device 230 may identify a P2P server network address and a P2P server port identifier, included in the traffic information for a P2P communication. The P2P server network address may be a P2P server source network address or a P2P server destination network address. The P2P server port identifier may be a P2P server source port identifier or a P2P server destination port identifier. Campaign enforcement device 230 may read from particular fields of packets carrying the traffic information to identify specific traffic information for P2P server 260, such as a network address, a port identifier, or the like.

As further shown, process 600 may include determining whether the P2P server information is associated with a toll-free data service campaign (block 630). For example, campaign enforcement device 230 may analyze the P2P server information, including a P2P server network address and a P2P server port identifier, to determine whether the P2P server network address and the P2P server port identifier are associated with a toll-free data service for a P2P communication.

In some implementations, campaign enforcement device 230 may compare the P2P server network address and the P2P server port identifier to a stored P2P server network address and a stored P2P server port identifier, marked as being associated with a toll-free data service for P2P communications. If the received P2P server network address and P2P server port identifier match the stored P2P server network address and the P2P server stored port identifier, then campaign enforcement device 230 may determine that the P2P server information is associated with a toll-free data service for P2P communications. If the received P2P server network address and P2P server port identifier do not match the stored P2P server network address and the stored P2P server port identifier, then campaign enforcement device 230 may determine that the P2P server information is not associated with a toll-free data service for P2P communications.

As further shown in FIG. 6, if the P2P server information is not associated with a toll-free data service campaign (block 630—No), then process 600 may include providing information that traffic flow for the P2P communication is not associated with a toll-free data service campaign (block 640). For example, campaign enforcement device 230 may mark the traffic flow and/or packets associated with the traffic flow as not being associated with a toll-free data service for a P2P communication. In some implementations, campaign enforcement device 230 may ignore the traffic flow and/or packets associated with the traffic flow. In some implementations, campaign enforcement device 230 may mark the traffic flow and/or packets only if the traffic flow is associated with a toll-free data service for P2P communications. In some implementations, campaign enforcement device 230 may provide instructions to PGW 225 to mark the traffic flow and/or packets associated with the traffic flow as not being associated with a toll-free data service for P2P communications.

Additionally, or alternatively, PGW 225 and/or campaign enforcement device 230 may count a quantity of data (e.g., in bytes) used in association with the traffic flow, and may provide data usage information (e.g., that identifies a quantity of data used) to AAA 240. In some implementations, campaign enforcement device 230 and/or PGW 225 may provide an instruction, to AAA 240, that causes the data usage information to be charged to mobile device 205 and/or P2P client device 275.

As further shown in FIG. 6, if the P2P server information is associated with a toll-free data service campaign (block 630—Yes), then process 600 may include determining whether campaign conditions are satisfied (block 650). For example, if campaign enforcement device 230 determines that the P2P server network address and P2P server port identifier are associated with a P2P communication for a toll-free data service campaign, then campaign enforcement device 230 may determine whether one or more campaign conditions are satisfied. A campaign condition may be identified in a campaign rule received from campaign control device 235 during deployment of a toll-free data service campaign.

As an example, a campaign condition may specify a time period during which a campaign is valid. If the request to access a P2P communication associated with the toll-free data service is received during the time period, then the campaign condition may be satisfied. If the request to access a P2P communication associated with the toll-free data service is not received during the time period, then the campaign condition may not be satisfied. As another example, a campaign condition may specify a geographic region in which the campaign is valid. If the request to access a P2P communication associated with the toll-free data service is received from the geographic region, then the campaign condition may be satisfied. If the request to access a P2P communication associated with the toll-free data service is not received from the geographic region, then the campaign condition may not be satisfied.

As another example, a campaign condition may specify a quantity of bytes reserved for a campaign. Campaign enforcement device 230 and/or PGW 225 may determine whether there are any bytes, out of the original reserved amount of bytes, available to be allocated to the request to access a P2P communication associated with the toll-free data service. For example, campaign enforcement device 230 may periodically request and/or may periodically receive, from campaign control device 235, information that identifies a quantity of available bytes. Campaign control device 235 may receive information regarding used bytes from one or more campaign enforcement devices 230, and may update the quantity of available bytes based on the received information. If there are available bytes to be allocated to the request to access a P2P communication associated with the toll-free data service, then the campaign condition may be satisfied.

If there are no available bytes (or not enough available bytes) to be allocated to the P2P communication for the toll-free data service, then campaign enforcement device 230 may request additional bytes from campaign control device 235. Additionally, or alternatively, campaign enforcement device 230 may receive additional bytes from campaign control device 235 with or without sending a request. When campaign enforcement device 230 determines that there are enough available bytes to meet the request, campaign enforcement device 230 may determine that the campaign condition is satisfied. If campaign control device 235, however, does not allocate additional bytes to the request to access the toll-free data service for a P2P communication, then the campaign condition may not be satisfied.

As another example, a campaign condition may be satisfied when a campaign is not marked as paused, and may not be satisfied when the campaign is marked is paused. In some implementations, campaign control device 235 and/or campaign enforcement device 230 may mark a campaign as paused based on information received from campaign input device 245. For example, a service provider may wish to pause a campaign, and may provide an instruction to pause the campaign using campaign input device 245. In some implementations, campaign enforcement device 235 may determine whether multiple campaign conditions, described herein, are satisfied.

As further shown in FIG. 6, if the campaign conditions are not satisfied (block 650—No), then process 600 may include providing a notification, to the mobile device, that the campaign conditions are not satisfied (block 660). For example, if campaign enforcement device 230 determines that the campaign conditions are not satisfied, then campaign enforcement device 230 may notify mobile device 205 and/or P2P client device 275 that the campaign conditions are not satisfied. The notification may indicate a reason that the campaign conditions were not satisfied, in some implementations (e.g., not enough available bytes, a request during an invalid time period, the campaign has been paused by the service provider, etc.). Mobile device 205 and/or P2P client device 275 may provide the notification for display so that a user may understand why the toll-free data service is not being provided.

In some implementations, the notification may provide an option for the user to access the requested service at the user's expense (e.g., indicating that the user will be charged for data usage associated with the requested service). If the user agrees to accept data charges, then campaign enforcement device 230 may provide information that traffic flow is not associated with a toll-free campaign data service. In some implementations, campaign enforcement device 230 may mark the traffic flow and/or packets associated with the traffic flow as not being associated with a toll-free data service for peer-to-peer communications. Additionally, or alternatively, PGW 225 and/or campaign enforcement device 230 may count a quantity of data (e.g., in bytes) used in association with the traffic flow, and may provide data usage information (e.g., that identifies a quantity of data used) to AAA 240. In some implementations, campaign enforcement device 230 and/or PGW 225 may provide an instruction, to AAA 240, that causes the data usage information to be charged to mobile device 205 and/or P2P client device 275. Additionally, or alternatively, campaign enforcement device 230 may prevent a traffic flow that charges a service provider associated with the toll-free data service from being established.

As further shown in FIG. 6, if the campaign conditions are satisfied (block 650—Yes), then process 600 may include providing information that a traffic flow is associated with the toll-free data service campaign (block 670). For example, if campaign enforcement device 230 determines that the campaign conditions are satisfied, then campaign enforcement device 230 may provide information that causes data usage for a traffic flow, associated with the P2P communication, to be charged to a service provider associated with the toll-free data service (e.g., a service provider identified in campaign information for deploying the toll-free data service, a service provider that input the campaign information, a service provider associated with a P2P application used for P2P communications, etc.). In some implementations, campaign enforcement device 230 may mark the traffic flow and/or packets associated with the traffic flow as being associated with a toll-free data service.

As an example, campaign enforcement device 230 may provide information to PGW 225 to mark packets, associated with the traffic flow, so that the service provider can be charged for data usage associated with the requested service. PGW 225 may route traffic (e.g., packets) associated with the requested service. Additionally, or alternatively, PGW 225 and/or campaign enforcement device 230 may count a quantity of data (e.g., in bytes) used in association with the requested service, and may provide data usage information (e.g., that identifies a quantity of data used) to AAA 240. Additionally, or alternatively, campaign enforcement device 230 and/or PGW 225 may provide an instruction, to AAA 240, that causes the data usage information to be charged to the service provider.

Using P2P server information, including a P2P server network address and a port identifier, for P2P servers facilitating communications between a mobile device and a P2P client device via a NAT, addresses the problem of not being able to detect a network address and a port of a P2P client device, located behind a NAT and engaged in P2P communications associated with a toll-free campaign. Thus, charging data usage to the P2P service provider for the toll-free data service is possible.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
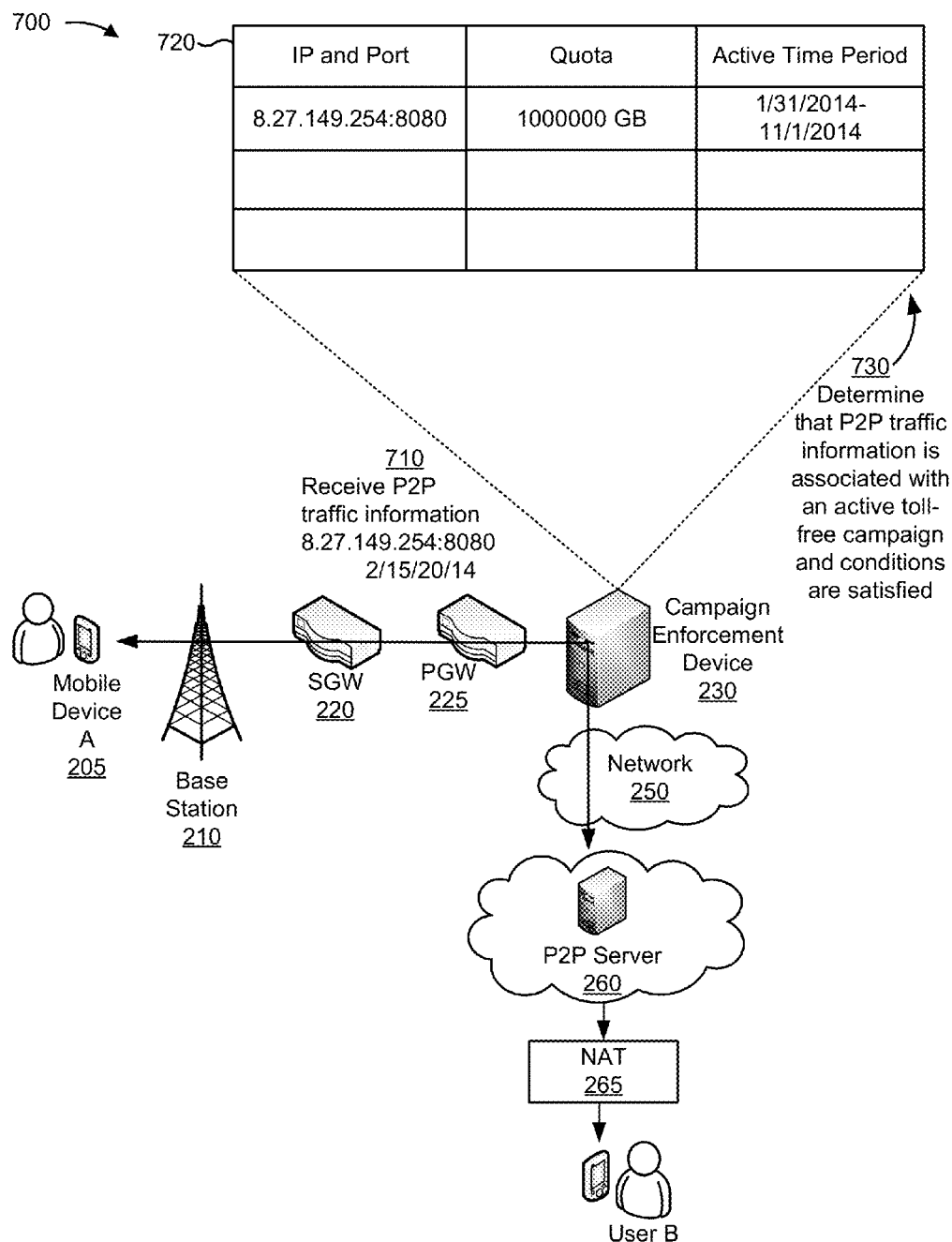
FIGS. 7A-7B are diagrams of an example implementation relating to the example process shown in FIG. 6.
Figure 7B:
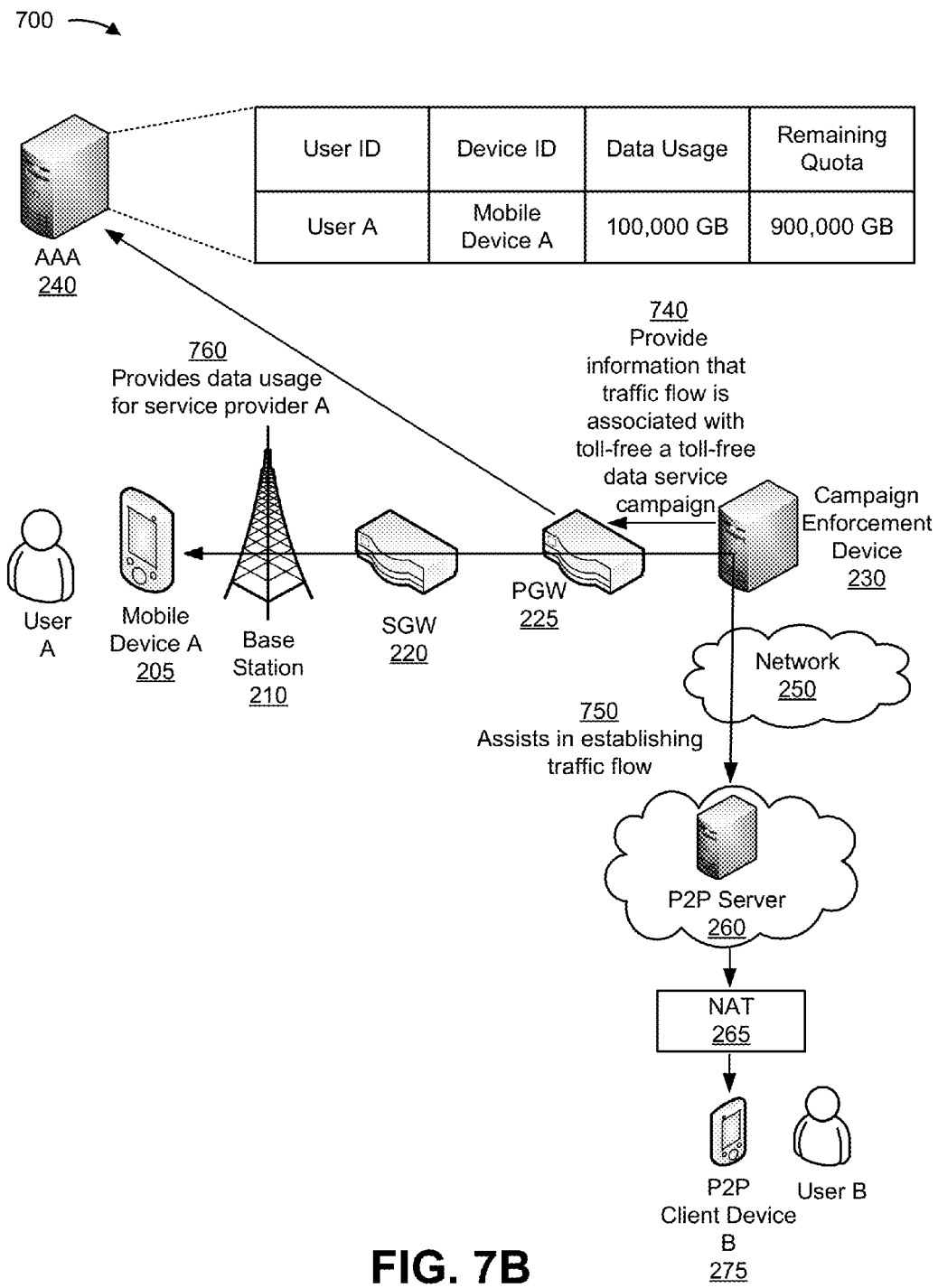

FIGS. 7A-7B are diagrams of an example implementation 700 relating to example process 600 shown in FIG. 6. FIGS. 7A-7B show an example of implementing a deployed toll-free data service campaign for P2P communications. For the purpose of FIGS. 7A-7B, assume that the operations described herein with respect to FIGS. 5A-5E have been performed.

As shown in FIG. 7A, assume that a user, shown as User A, interacts with Mobile Device A (e.g., mobile device 205) to engage in a P2P communication with User B, interacting with P2P Client Device B, over a P2P network associated with Service Provider A. As further shown, assume that P2P Client Device B is located behind a NAT (e.g., NAT 265). The P2P network includes P2P server 260 and P2P authentication server 255. As shown in FIG. 7A, assume that P2P server 260 has, for example, a network address=8.27.149.254 and a port identifier=8080.

As shown in FIG. 7A, assume that P2P server 260 facilitates the P2P communication between Mobile Device A and P2P Client Device B. Assume that the network address for P2P server 260 serves as either a source network address or a destination network address for the P2P communication. Assume that the port for P2P server 260 serves as either a source port or destination port for the P2P communication. As shown in FIG. 7A, and by reference number 710, campaign enforcement device 230 receives traffic information for the P2P communication. Traffic information for the P2P communication may include a source or destination network address for P2P server 260 and/or source or a destination port identifier for P2P server 260.

As shown by reference number 720, campaign enforcement device 230 compares the received P2P server network address and the P2P server port identifier, provided in the traffic information, to a list of stored P2P server network addresses and P2P server port identifiers, and determines that the received P2P server network address and the P2P server port identifier matches a stored P2P server network address and a stored P2P server port identifier.

As shown in FIG. 7A, campaign enforcement server 230 determines that all campaign conditions, associated with the toll-free data service, are satisfied. For example, campaign enforcement device 230 determines that the date of the request is within the time period for the campaign. Thus, as shown by reference number 730, campaign enforcement device 230 determines that the traffic information, including the P2P server network address and the P2P server port identifier for P2P server 260, is associated with an active toll-free data service, and the campaign conditions are satisfied.

As shown in FIG. 7B, and by reference number 740, assume that campaign enforcement device 230 provides information, to PGW 225, to mark packets associated with the traffic flow so that Service Provider A (e.g., which provides the toll-free data service for P2P communications) may be charged for data usage. As shown by reference number 750, assume that PGW 225 assists in establishing the traffic flow between mobile device 205 (e.g., Mobile Device A) and P2P client device 275 (e.g., P2P Client Device B) via campaign enforcement device 230. As shown by reference number 760, assume that PGW 225 provides data usage information, for the traffic flow between Mobile Device A and P2P Client Device B to AAA 240. Based on the received data usage information, assume that AAA 240 updates accounting information for Service Provider A, which indicates a quantity of bytes used by Mobile Device A and/or P2P Client Device B in association with the established traffic flow. In this way, AAA 240 may charge a service provider for data usage when mobile device 205 and/or P2P client device 275 participate in a P2P communication associated with a toll-free data service.

As indicated above, FIGS. 7A-7B are provided merely as an example. Other examples are possible and may differ from what was described with regard to FIGS. 7A-7B.

Implementations described herein enable charging data usage for a P2P communication associated with a toll-free data service campaign, to a P2P service provider, based on determining traffic information, associated with a P2P server, used to facilitate the P2P communication via a NAT.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

To the extent the aforementioned embodiments collect, store or employ personal information provided by individuals, it should be understood that such information shall be used in accordance with all applicable laws of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
one or more devices to:
receive traffic information for a peer-to-peer communication associated with a peer-to-peer network,
the peer-to-peer communication including a traffic flow between a mobile device and a peer-to-peer client device via a peer-to-peer server associated with the peer-to-peer network;
identify peer-to-peer server information associated with the peer-to-peer server and included in the traffic information;
compare the peer-to-peer server information with stored peer-to-peer server information associated with a toll-free data service campaign;
determine that the peer-to-peer server information is associated with the toll-free data service campaign if the peer-to-peer server information matches the stored peer-to-peer server information; and
provide information to cause data charges, for the traffic flow, to be charged to a service provider associated with the toll-free data service campaign based on determining that the peer-to-peer server information provided in the traffic information is associated with the toll-free data service campaign.

2. The system of claim 1, where the stored peer-to-peer server information is received in real-time or near real-time from a peer-to-peer authentication device associated with the peer-to-peer network.

3. The system of claim 1, where the one or more devices are further to:
determine whether campaign conditions, associated with the toll-free data service campaign, are satisfied.

4. The system of claim 3, where the one or more devices are further to:
provide a notification to the mobile device and/or the peer-to-peer client device when the campaign conditions are not satisfied.

5. The system of claim 3, where, when determining whether campaign conditions are satisfied, the one or more devices are further to:
determine that the peer-to-peer communication is within a valid time period for the toll-free data service campaign,
the valid time period being specified in the campaign conditions,
the campaign conditions being satisfied when the peer-to-peer communication is within the valid time period.

6. The system of claim 3, where, when determining that campaign conditions are satisfied, the one or more devices are further to:
determine that the peer-to-peer communication is within a geographic region for the toll-free data service campaign,
the geographic region being specified in the campaign conditions,
the campaign conditions being satisfied when the peer-to-peer communication is within the geographic region.

7. The system of claim 3, where, when determining that campaign conditions are satisfied, the one or more devices are further to:
determine that a quantity of bytes, allotted to the toll-free data service campaign, is available for the peer-to-peer communication,
the quantity of bytes, allotted to the toll-free data service campaign, being specified in the campaign conditions,
the campaign conditions being satisfied when the quantity of bytes is available.

8. A non-transitory computer-readable medium storing instructions, the instructions comprising:
one or more instructions that, when executed by one or more processors, cause the one or more processors to:
receive traffic information for a peer-to-peer communication associated with a peer-to-peer network,
the peer-to-peer communication including a traffic flow between a mobile device and a peer-to-peer client device via a peer-to-peer server associated with the peer-to-peer network;
identify peer-to-peer server information associated with the peer-to-peer server and included in the traffic information;
compare the peer-to-peer server information with stored peer-to-peer server information, associated with a toll-free data service campaign, that was received from a peer-to-peer authentication server associated with the peer-to-peer network;
determine that the peer-to-peer server information is associated with the toll-free data service campaign if the peer-to-peer server information matches the stored peer-to-peer server information; and
provide information to cause data charges, for the traffic flow, to be charged to a service provider associated with the toll-free data service campaign based on determining that the peer-to-peer server information is associated with the toll-free data service campaign.

9. The non-transitory computer-readable medium of claim 8, where the one or more instructions, that cause the one or more processors to determine that the peer-to-peer server information is associated with toll-free data service campaign, further cause the one or more processors to:
determine whether the peer-to-peer server information includes a source network address and a source port identifier for the peer-to-peer server; and
determine that the source network address and the source port identifier match a stored network address and a stored port identifier associated with the toll-free data service campaign.

10. The non-transitory computer-readable medium of claim 8, where the one or more instructions, that cause the one or more processors to determine that the peer-to-peer server information is associated with toll-free data service campaign, further cause the one or more processors to:
determine whether the peer-to-peer server information includes a destination network address and a destination port identifier for the peer-to-peer server; and
determine that the destination network address and the destination port identifier for the peer-to-peer server match a stored network address and a stored port identifier associated with the toll-free data service campaign.

11. The non-transitory computer-readable medium of claim 8, where the one or more instructions further cause the one or more processors to:
provide a notification, to the mobile device and/or peer-to-peer client device, indicating that the traffic flow is not associated with the toll-free data service campaign based on determining that the peer-to-peer server information is not associated with the toll-free data service campaign.

12. The non-transitory computer-readable medium of claim 8, where the one or more instructions further cause the one or more processors to:

provide information to cause data usage for the traffic flow to be charged to the mobile device and/or the peer-to-peer client device when the traffic flow is not associated with the toll-free data service campaign.

13. The non-transitory computer-readable medium of claim 12, where the information to cause data charges, for the traffic flow, to be charged to the mobile device and/or the peer-to-peer client device, is provided to a packet data network gateway and/or an authentication, authorization, and accounting server (AAA).

14. The non-transitory computer-readable medium of claim 8, where the stored peer-to-peer server information is updated in real-time or near real-time relative to the peer-to-peer server information being output from the peer-to-peer server.

15. The non-transitory computer-readable medium of claim 8, where the peer-to-peer client device is located behind a network address translator.

16. A method, comprising:

receiving, by a device and from a mobile device or a peer-to-peer client device, traffic information for a peer-to-peer communication associated with a peer-to-peer network, where the peer-to-peer client device is located behind a network address translator;

identifying, by a device, peer-to-peer server information included in the traffic information;

comparing, by a device, the peer-to-peer server information with stored peer-to-peer server information associated with a toll-free data service campaign, the stored peer-to-peer server information being received in real-time or near real-time relative to receiving the peer-to-peer server information from a peer-to-peer server associated with the peer-to-peer network;

determining, by a device, that the peer-to-peer server information is associated with the toll-free data service campaign if the peer-to-peer server information matches the stored peer-to-peer server information; and providing, by a device, information to cause data charges, for the peer-to-peer communication, to be charged to a service provider associated with the toll-free data service campaign based on determining that the peer-to-peer server information provided in the traffic information is associated with the toll-free data service campaign.

17. The method of claim 16, where determining that the peer-to-peer server information is associated with the toll-free data service campaign further comprises:

determining whether the peer-to-peer server information includes a source network address and a source port identifier for the peer-to-peer server.

18. The method of claim 16, where determining that the peer-to-peer server information is associated with the toll-free data service campaign further comprises:

determining whether the peer-to-peer server information includes a destination network address and a destination port identifier for the peer-to-peer server.

19. The method of claim 16, where the stored peer-to-peer server information is updated in real-time or near real-time relative to the peer-to-peer server information being output from the peer-to-peer server.

20. The method of claim 16, where the peer-to-peer server is a mobile device promoted as a peer-to-peer server.

\* \* \* \* \*